(12) United States Patent
Akiyama

(10) Patent No.: US 8,628,199 B2
(45) Date of Patent: Jan. 14, 2014

(54) LIGHT SOURCE DEVICE WITH A PLURALITY OF LIGHT SOURCES AND A COLLIMATING LENS

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 13/170,707

(22) Filed: Jun. 28, 2011

(65) Prior Publication Data

US 2012/0008098 A1 Jan. 12, 2012

(30) Foreign Application Priority Data

Jul. 6, 2010 (JP) .................................. 2010-153670

(51) Int. Cl.
*G03B 21/14* (2006.01)
(52) U.S. Cl.
USPC .................. 353/94; 353/38; 362/84; 362/293
(58) Field of Classification Search
USPC ........... 353/30, 38, 94, 121, 122; 362/84, 293
See application file for complete search history.

(56) References Cited

U.S. PATENT DOCUMENTS

| 2003/0147055 | A1* | 8/2003 | Yokoyama | 353/98 |
| 2007/0097501 | A1* | 5/2007 | Stern et al. | 359/453 |
| 2011/0043762 | A1* | 2/2011 | Miyamae et al. | 353/20 |
| 2011/0188010 | A1* | 8/2011 | Lin et al. | 353/99 |
| 2012/0019788 | A1* | 1/2012 | Katou et al. | 353/33 |

FOREIGN PATENT DOCUMENTS

| JP | A-2004-327361 | 11/2004 |
| JP | A-2011-158502 | 8/2011 |

* cited by examiner

*Primary Examiner* — Francis M Legasse, Jr.
*Assistant Examiner* — Bao-Luan Le
(74) *Attorney, Agent, or Firm* — Oliff & Berridge, PLC

(57) ABSTRACT

A light source device 10 includes an excitation light generation section 20 having a solid-state light source array 22 having a solid-state light source 25 adapted to generate an excitation light, an excitation light generation section 30 having a solid-state light source array 32 having a solid-state light source 35 adapted to generate an excitation light, an excitation light combining section 50 adapted to combine the excitation light from the excitation light generation section 20 and the excitation light from "30" with each other, a light collection optical system 60 adapted to collect the excitation light at a predetermined light collection position, and a fluorescence generation section 70 having a fluorescent layer adapted to generate a fluorescence from at least a part of the excitation light collected by the light collection optical system 60.

19 Claims, 10 Drawing Sheets

LIGHT SOURCE DEVICE WITH A PLURALITY OF LIGHT SOURCES AND A COLLIMATING LENS

The entire disclosure of Japanese Patent Application No. 2010-153670, filed Jul. 6, 2010, is expressly incorporated by reference herein.

BACKGROUND

1. Technical Field

The present invention relates to a light source device and a projector.

2. Related Art

In the past, there has been known a light source device provided with a plurality of solid-state light sources for generating excitation light and a fluorescent layer located at a light collection position to which the excitation light generated by the plurality of solid-state light sources is collected and for generating fluorescence from the excitation light. Further, there has been known a projector equipped with such a light source device (e.g., JP-A-2004-327361). According to the light source device of the related art, since the fluorescence is generated in the fluorescent layer located at the light collection position to which the excitation light from the plurality of solid-state light sources is collected, it becomes possible to increase the light intensity without increasing the area of the light emitting region, and thus it becomes possible to increase the luminance of the light source device without degrading the light efficiency.

Incidentally, in the technical field of the light source device, the light source device capable of further increasing the luminance of the light source device without degrading the light efficiency is always pursued.

SUMMARY

Therefore, the invention has been made in view of the circumstances described above, and has an object of providing a light source device capable of further increasing the luminance of the light source device without degrading the light efficiency. Further, the invention has an object of providing a projector equipped with such a light source device and capable of further increasing the luminance of a display screen without degrading the light efficiency.

A light source device according to the invention includes a first excitation light generation section having a first solid-state light source array having a first solid-state light source adapted to generate a first excitation light, and a first collimating lens array having a first collimating lens disposed so as to correspond to the first solid-state light source, and adapted to roughly collimate the excitation light generated by the first solid-state light source, a second excitation light generation section having a second solid-state light source array having a second solid-state light source adapted to generate a second excitation light, and a second collimating lens array having a second collimating lens disposed so as to correspond to the second solid-state light source, and adapted to roughly collimate the excitation light generated by the second solid-state light source, an excitation light combining section adapted to combine the first excitation light and the second excitation light, a light collection optical system adapted to collect the first excitation light and the second excitation light combined by the excitation light combining section at a predetermined light collection position, and a fluorescence generation section located in a vicinity of the light collection position, and having a fluorescent layer adapted to generate a fluorescence from at least a part of the first excitation light and the second excitation light collected by the light collection optical system, wherein the first solid-state light source array includes at least two first solid-state light sources, the second solid-state light source array includes at least two second solid-state light sources, the first collimating lens array includes at least two first collimating lenses, the second collimating lens array includes at least two second collimating lenses, and the excitation light combining section transmits the first excitation light and reflects the second excitation light to thereby combine the first excitation light and the second excitation light with each other.

According to the light source device of the invention, since the fluorescence is generated using the excitation lights from the two excitation light generation sections (the first and second excitation light generation sections) each having a plurality of solid-state light sources, it becomes possible to further increase the luminance of the light source device.

Further, according to the light source device of the invention, it is arranged that the excitation lights from the two excitation light generation sections are combined using the excitation light combining section, and then collected by the light collection optical system. Therefore, it becomes possible to make the excitation light enter the fluorescent layer with smaller incident angle compared to the case of combining the excitation lights from the two excitation light generation sections without using the excitation light combining section according to the invention, and in that sense, there is no chance that the light efficiency is degraded due to the use of the two excitation light generation sections.

As a result, the light source device according to the invention becomes a light source device capable of further increasing the luminance of the light source device without degrading the light efficiency.

In the light source device according to the invention, it is preferable that the first excitation light and the second excitation light are arranged to enter respective areas different from each other in a fluorescence generation area as a light collection area in the fluorescent layer.

According to the light source device of the invention, since the excitation light from each of the two excitation light generation sections enters the inside of the fluorescence generation area as the light collection area in the fluorescent layer, the area of the fluorescence generation area where the fluorescence is generated becomes sufficiently small. Therefore, there is no chance that the light efficiency is degraded due to the use of the two excitation light generation sections.

It should be noted that from this viewpoint, it is preferable that the fluorescence generation area has a size included in a square 1 mm on a side.

Further, according to the light source device of the invention, since the excitation lights from the two excitation light generation sections enter the respective regions different from each other although located inside the fluorescence generation area having a sufficiently small size as described above, there is no chance that an excessively large thermal load is applied to a certain area in the fluorescence generation area described above. Therefore, there is no chance that the life of the fluorescent layer is shortened due to the use of the two excitation light generation sections.

It should be noted that as the configuration in which the excitation lights from the two excitation light generation sections enter the respective areas different from each other in the fluorescence generation area described above, there can be cited, as an example, a configuration of shifting the layout positions of the first excitation light generation section and the second excitation light generation section from each other in a plane perpendicular to the light axis of the excitation light, or a configuration of shifting the angle between the optical axis of the light collection optical system and the excitation light combining surface slightly from an angle of 45 degrees.

In the light source device according to the invention, it is preferable that the light source device is arranged to input the first excitation light and the second excitation light into respective areas different from each other in the excitation light combining section.

By adopting such a configuration, since the excitation lights from the two excitation light generation sections enter the respective areas different from each other in the excitation light combining section, there is no chance that the excessively large thermal load is applied to a certain area of the excitation light combining section. Therefore, there is no chance that the life of the excitation light combining section is shortened due to the use of the two excitation light generation sections.

In the light source device according to the invention, it is preferable that the excitation light combining section has a transmission area adapted to transmit the first excitation light and a reflecting area adapted to reflect the second excitation light.

By adopting such a configuration, it becomes possible to combine the excitation light from the first excitation light generation section and the excitation light from the second excitation light generation section with each other with high efficiency by inputting the excitation light from the first excitation light generation section into the transmission areas while inputting the excitation light from the second excitation light generation section into the reflecting areas.

In this case, as the excitation light combining section, there can be cited, as an example, "a reflecting mirror provided with openings formed in the areas corresponding to the transmission areas" or "a transparent substrate provided with a reflecting layer formed in the areas corresponding to the reflecting areas."

In the light source device according to the invention, it is preferable that the excitation light combining section consists of a polarization beam combiner adapted to transmit light consisting of one polarized light and reflect light consisting of the other polarized light, and the light source device is arranged so that the first excitation light enters the excitation light combining section as the excitation light consisting of the one polarized light and the second excitation light enters the excitation light combining section as the excitation light consisting of the other polarized light.

By adopting such a configuration, it becomes possible to combine the excitation light from the first excitation light generation section and the excitation light from the second excitation light generation section with high efficiency using the principle of the polarization beam combiner.

In the light source device according to the invention, it is preferable that the fluorescence generation section is disposed at a position where the first excitation light and the second excitation light collected by the light collection optical system enter the fluorescent layer in a defocused state.

By adopting such a configuration, since the fluorescence with high intensity can be obtained without applying the excessively large thermal load to the fluorescent layer, it becomes possible to realize the light source device capable of preventing the deterioration and burnout of the fluorescent layer to thereby further increase the life thereof.

In the light source device according to the invention, it is preferable that in the first excitation light generation section and the second excitation light generation section, the first solid-state light sources and the second solid-state light sources are each arranged in a matrix, and the light source device is configured so that first entrance areas where the first excitation light enters and second entrance areas where the second excitation light enters are arranged alternately in the fluorescent layer.

By adopting such a configuration, it becomes possible to input the excitation lights from the two excitation light generation sections evenly across the inside of the fluorescence generation area.

It should be noted that as the configuration in which the first entrance areas and the second entrance areas are arranged alternately, there can be cited, as an example, a configuration of shifting the layout positions of the first excitation light generation section and the second excitation light generation section from each other in a plane perpendicular to the light axis of the excitation light, or a configuration of shifting the angle between the optical axis of the light collection optical system and the excitation light combining surface slightly from an angle of 45 degrees.

In the light source device according to the invention, it is preferable that both of the first solid-state light source and the second solid-state light source are each formed of a semiconductor laser.

Since the semiconductor laser is small in size and high in output power, by adopting such a configuration as described above, the small-sized and high power light source device is obtained.

It should be noted that in the case in which both of the first solid-state light source and the second solid-state light source are each formed of a semiconductor laser, and the excitation light combining section having the transmission areas for transmitting the excitation light from the first excitation light generation section and the reflecting areas for reflecting the excitation light from the second excitation light generation section is used, since the semiconductor laser emits the laser beam having a preferable light collection property, there is also obtained an advantage of efficiently inputting the excitation light from the first excitation light generation section into the transmission areas, and efficiently inputting the excitation light from the second excitation light generation section into the reflecting areas.

On the other hand, in the case in which both of the first solid-state light source and the second solid-state light source are each formed of the semiconductor laser, and the excitation light combining section consisting of the polarization beam combiner is used, since the semiconductor laser emits the excitation light consisting of the polarized light, and therefore, there is no need for converting the excitation light into the excitation light consisting of the polarized light, there is also obtained an advantage that the structure of the light source device can be made simple.

In the light source device according to the invention, it is preferable that the semiconductor laser is configured to have an emission area having rectangular shape, and a spread angle along a short side of the emission area larger than a spread angle along a long side of the emission area, and each of the emission areas of the first solid-state light sources and each of the emission areas of the second solid-state light sources have a relationship in which orientations of the long side and the short side are reverse to each other.

By adopting such a configuration, since the excitation lights from the two excitation light generation sections enter the respective regions different from each other although located inside the fluorescence generation area having a sufficiently small size as described above, there is no chance that the excessively large thermal load is applied to a certain area in the fluorescence generation area described above. Therefore, there is no chance that the life of the fluorescent layer is shortened due to the use of the two excitation light generation sections.

It should be noted that it is preferable for the semiconductor laser to have the long side of the emission area equal to or larger than three times of the short side of the emission area.

Further, it is preferable for the semiconductor laser to have the spread angle along the short side direction of the emission area equal to or larger than three times of the spread angle along the long side direction of the emission area.

A projector according to the invention includes an illumination device having the light source device according to the invention, a light modulation device adapted to modulate light from the illumination device in accordance with image information, and a projection optical system adapted to project the modulated light from the light modulation device as a projection image.

Therefore, according to the projector of the invention, since the light source device according to the invention capable of further increasing the luminance without degrading the light efficiency is provided, the projector capable of further increasing the luminance of the display screen without degrading the light efficiency is obtained.

BRIEF DESCRIPTION OF THE DRAWINGS

The invention will be described with reference to the accompanying drawings, wherein like numbers reference like elements.

FIGS. 2A through 2C are diagrams showing a light source device 10 according to the first embodiment for the purpose of the explanation thereof.

DESCRIPTION OF EXEMPLARY EMBODIMENTS

Hereinafter, a light source device and a projector according to the invention will be explained based on some embodiments shown in the accompanying drawings.

First Embodiment

Figure 1:
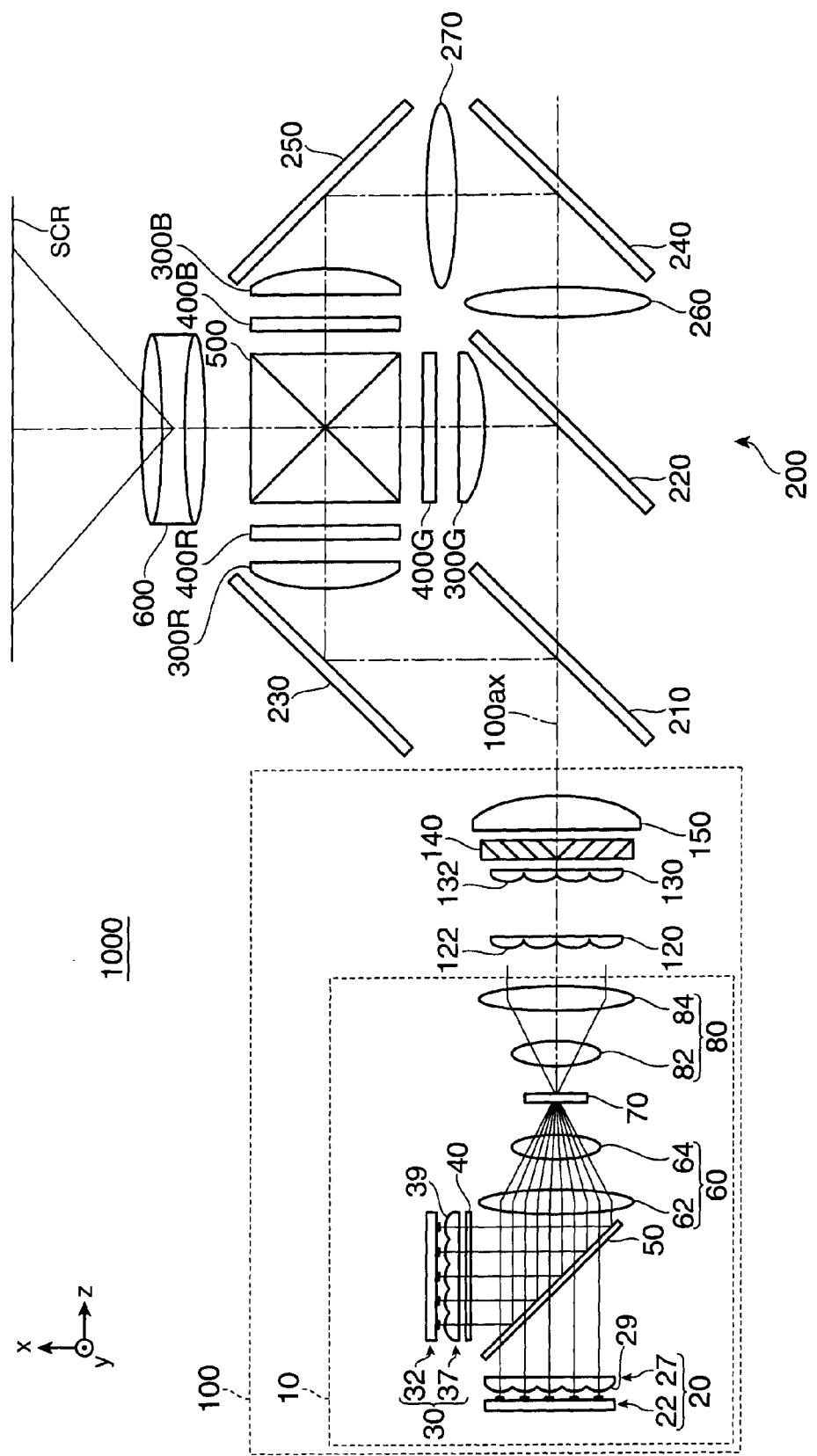
FIG. 1 is a plan view showing an optical system of a projector 1000 according to a first embodiment.

FIG. 1 is a plan view showing an optical system of a projector 1000 according to a first embodiment.

Figure 2B:
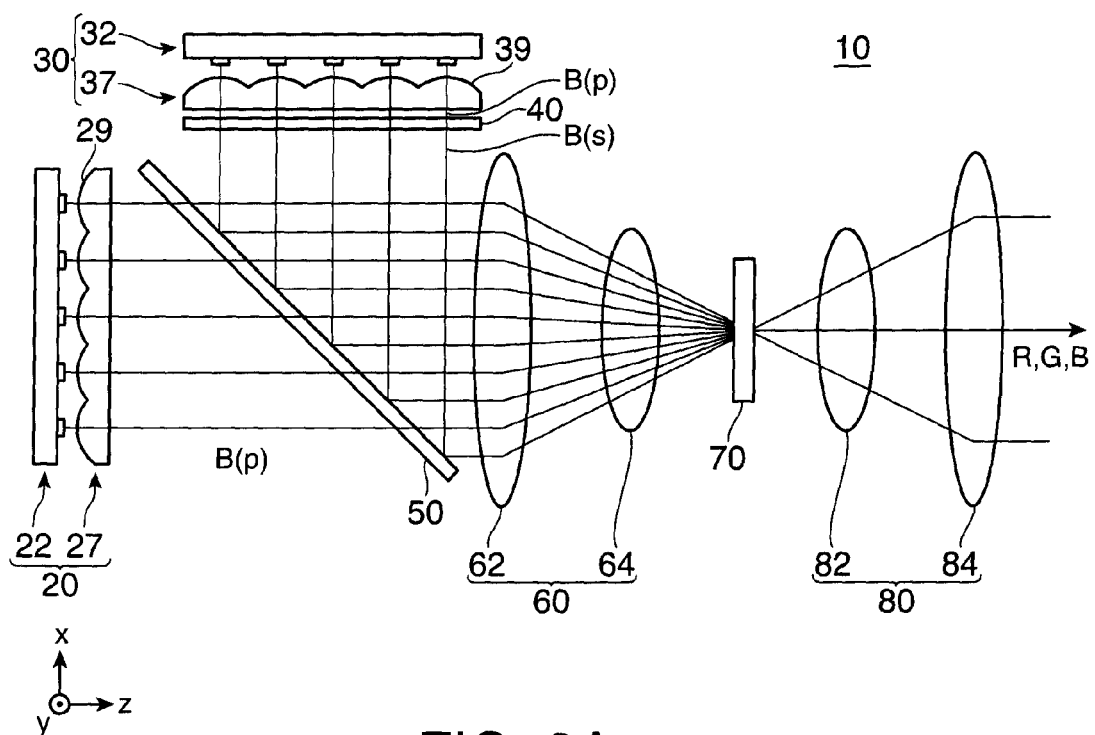
Figure 2B:
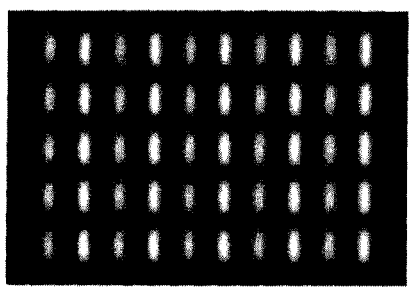
Figure 2C:
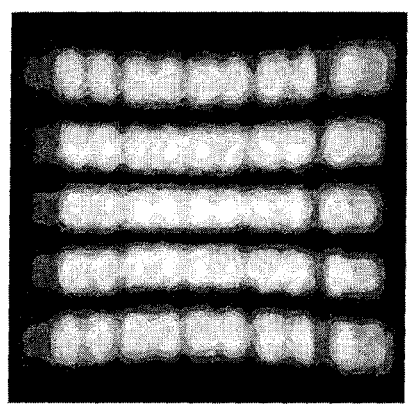

FIGS. 2A through 2C are diagrams showing a light source device 10 according to the first embodiment for the purpose of the explanation thereof. FIG. 2A is a plan view showing an optical system of the light source device 10, FIG. 2B is a diagram showing the intensity distribution of the excitation light (blue light) in an excitation light combining section 50, and FIG. 2C is a diagram showing the intensity distribution of the excitation light (the blue light) input inside the fluorescence generation area in a fluorescent layer 72. It should be noted that in FIGS. 2B and 2C, the closer to white the color is, the stronger the intensity of the excitation light (the blue light) input thereto is. The same can be applied to FIGS. 5B, 5C, 7B, and 7C.

Figure 3A:
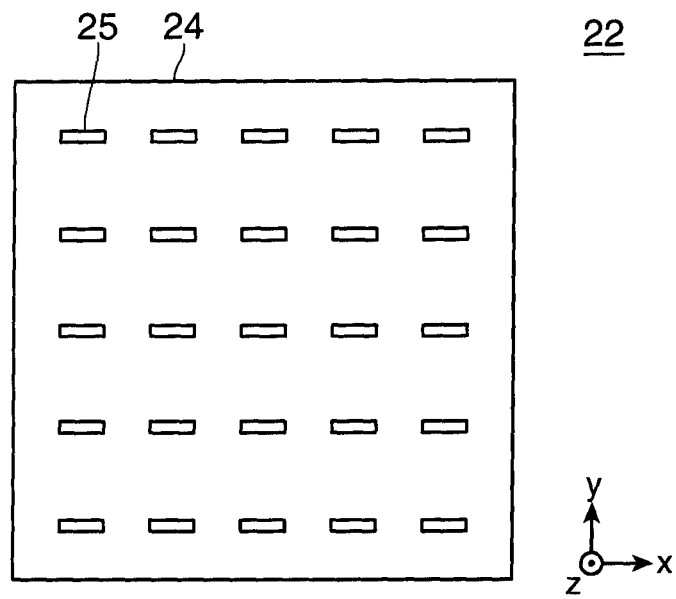
FIGS. 3A and 3B are diagrams showing a first solid-state light source array 22 and a second solid-state light source array 32 in the first embodiment for the purpose of the explanation thereof.
Figure 3B:
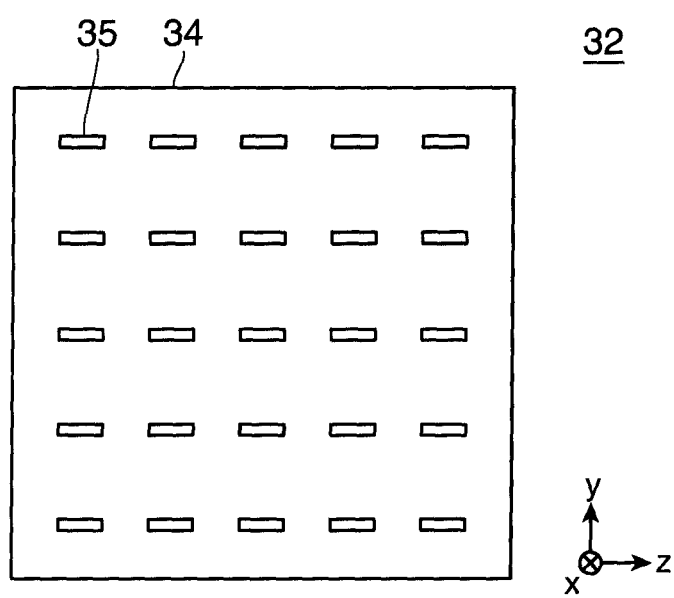

FIGS. 3A and 3B are diagrams showing a first solid-state light source array 22 and a second solid-state light source array 32 in the first embodiment for the purpose of the explanation thereof. FIG. 3A is a diagram of the first solid-state light source array 22 viewed from the side of the excitation light combining section 50, and FIG. 3B is a diagram of the second solid-state light source array 32 viewed from the side of the excitation light combining section 50.

Figure 4A:
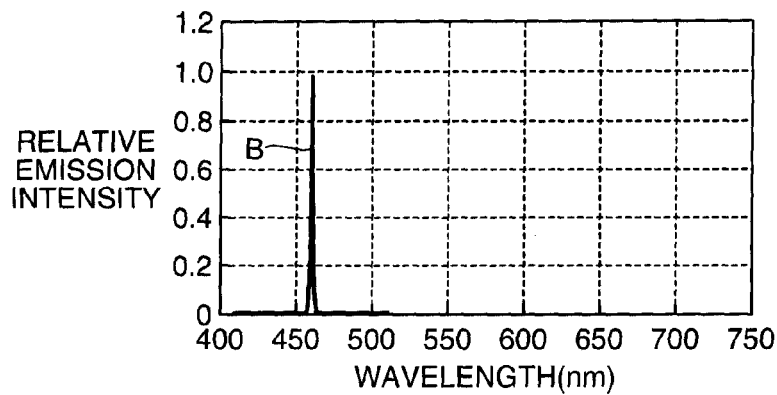
FIGS. 4A through 4C are graphs respectively showing the emission intensity characteristics of a first solid-state light source 25, the emission intensity characteristics of a second solid-state light source 35, and the emission intensity characteristics of a fluorescent material in the first embodiment.
Figure 4B:
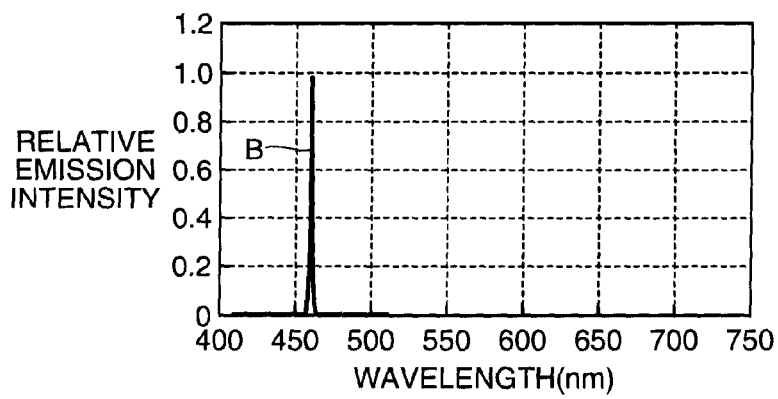
Figure 4C:
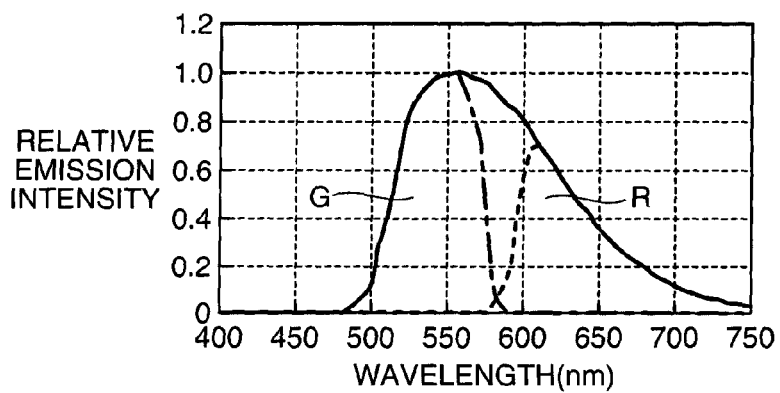

FIGS. 4A through 4C are graphs respectively showing the emission intensity characteristics of a first solid-state light source 25, the emission intensity characteristics of a second solid-state light source 35, and the emission intensity characteristics of a fluorescent material in the first embodiment. FIG. 4A is a graph showing the emission intensity characteristics of the first solid-state light source 25, FIG. 4B is a graph showing the emission intensity characteristics of the second solid-state light source 35, and FIG. 4C is a graph showing the emission intensity characteristics of the fluorescent material included in a fluorescent layer 72. The emission intensity characteristics denote the characteristics of the light source regarding the wavelength and the intensity of the light emitted therefrom in response to application of the voltage, or the characteristics of the fluorescent material regarding the wavelength and the intensity of the light emitted therefrom in response to input of the excitation light. The vertical axes of the graphs represent the relative emission intensity assuming that the emission intensity at the wavelength at which the emission intensity is the highest is 1. The lateral axes of the graphs represent wavelength.

It should be noted that in each of the drawings the reference symbol R represents red light, the reference symbol G represents green light, and the reference symbol B represents blue light. Further, the colored light denoted by a symbol suffixed with (p) is the light consisting of p-polarized light, the colored light denoted by a symbol suffixed with (s) is the light consisting of s-polarized light, and the colored light denoted by a symbol suffixed with neither (p) nor (s) is the light consisting of both of p-polarized light and s-polarized light.

In the present specification and the drawings, the constituents (e.g., the housing and fixing members for fixing the constituents) having no direct implication on the optical system will be omitted from the description and the illustration.

As shown in FIG. 1, the projector 1000 according to the first embodiment is provided with the illumination device 100, a color separation light guide optical system 200, three liquid crystal light modulation devices 400R, 400G, and 400B as a light modulation device, a cross dichroic prism 500, and a projection optical system 600.

The illumination device 100 is provided with the light source device 10, a first lens array 120, a second lens array 130, a polarization conversion element 140, and an overlapping lens 150. The illumination device 100 emits white light including red light, green light, and blue light.

As shown in FIGS. 1 and 2A, the light source device is provided with a first excitation light generation section 20, a second excitation light generation section 30, a λ/2 plate 40, the excitation light combining section 50, a light collection optical system 60, a fluorescence generation section 70, and a collimating optical system 80. The light source device 10 emits the white light as a whole.

The first excitation light generation section 20 has the first solid-state light source array 22 and a collimator lens array 27.

As shown in FIG. 3A, the first solid-state light source array 22 has a substrate 24, and 25 first solid-state light sources 25 each generating the blue light as the excitation light. In the first solid-state light source array 22, the 25 first solid-state light sources are arranged in a 5×5 matrix. In FIG. 3A, the reference numeral is attached only to the upper-leftmost one of the first solid-state light sources 25.

It should be noted that in the light source device according to the present embodiment, the number of first solid-state light sources is not limited to 25, but is only required to be plural, namely two or more. The same can be applied to the number of second solid-state light sources described later.

The substrate 24 has a function of mounting the solid-state light sources 25. Although the detailed explanation is omitted, the substrate 24 also has a function of intervening the power supply to the solid-state light sources 25, a function of radiating the heat generated in the solid-state light sources 25, and so on.

The solid-state light sources 25 are each formed of a semiconductor laser for generating the blue light (with a peak emission intensity at around 460 nm, see FIG. 4A) as the excitation light. As shown in FIG. 3A, the semiconductor laser has a rectangular emission area, and is configured so that the spread angle along the short side direction of the emission area becomes larger than the spread angle along the long side direction of the emission area. The dimension of the emission area in the semiconductor laser is 8 μm in the long side and 2 μm in the short side, for example.

The solid-state light sources 25 generate the blue light consisting of p-polarized light. Therefore, the blue light from the first excitation light generation section 20 enters the excitation light combining section 50 as the blue light consisting of p-polarized light. It should be noted that in order for making the excitation light from the first excitation light generation section enter the excitation light combining section as the excitation light consisting of p-polarized light, it is also possible to use a solid-state light source for emitting the excitation light consisting of s-polarized light and a λ/2 plate instead of using the solid-state light source for generating the excitation light consisting of p-polarized light as described above.

The collimator lens array 27 is disposed so as to correspond to the plurality of first solid-state light sources 25, and has 25 collimator lenses 29 (the reference numeral is provided only to one located at the end in the drawing) for roughly collimating the blue light generated by the plurality of first solid-state light sources 25, respectively. Although the explanation with illustration is omitted, the plurality of collimator lenses 29 is arranged in a 5×5 matrix. The collimator lenses 29 are each formed of a planoconvex lens.

The collimator lens array 27 is disposed so that the convex surfaces in the plurality of collimator lenses 29 face to the side of the first solid-state light source array 22. It should be noted that the collimator lens array can also be disposed so that the flat surfaces in the plurality of collimator lenses face to the side of the first solid-state light source array.

The second excitation light generation section 30 has the second solid-state light source array 32 and a collimator lens array 37.

As shown in FIGS. 1, 3B, and 4B, since the second solid-state light source array 32 and the collimator lens array 37 have the substantially the same configuration as that of the first solid-state light source array 22 and the collimator lens array 27, the explanation therefor will be omitted. It should be noted that the reference numeral 34 denotes a substrate of the second solid-state light source array 32, the reference numeral 35 denotes the second solid-state light source, and the reference numeral 39 denotes the collimator lens.

As shown in FIGS. 1 and 2A, the first excitation light generation section 20 and the second excitation light generation section 30 are arranged so that the blue light from the first excitation light generation section and the blue light from the second excitation light generation section 30 are shifted from each other in a plane perpendicular to the light axis of the blue light combined by the excitation light combining section 50 described later.

The λ/2 plate 40 is a wave plate having a function of converting the blue light consisting of p-polarized light from the second excitation light generation section into the blue light consisting of s-polarized light. Due to the λ/2 plate 40, the blue light from the second excitation light generation section 30 enters the excitation light combining section 50 as the blue light consisting of s-polarized light.

The excitation light combining section 50 transmits the blue light (first excitation light) from the first excitation light generation section 20 and reflects the blue light (second excitation light) from the second excitation light generation section 30 to thereby combine the blue light from the first excitation light generation section 20 and the blue light from the second excitation light generation section 30. The excitation light combining section 50 consists of a polarization beam combiner for transmitting the light consisting of p-polarized light and reflecting the light consisting of s-polarized light. The excitation light combining section 50 is disposed so that the angle between the optical axis of the light collection optical system 60 and the excitation light combining surface 50 becomes 45 degrees.

As shown in FIG. 2B, in the excitation light combining section 50, the blue light from the first excitation light generation section 20 and the blue light from the second excitation light generation section 30 enter respective regions different from each other. As a result, the intensity distributions arranged in a 5×10 matrix are obtained.

The light collection optical system 60 collects the blue light combined by the excitation light combining section 50 to a predetermined light collection position. As shown in FIGS. 1 and 2A, the light collection optical system 60 is provided with a first lens 62 and a second lens 64. The first lens 62 and the second lens 64 are each formed of a biconvex lens. It should be noted that the shapes of the first lens and the second lens are not limited to the shape described above, but can be the shapes with which the light collection optical system composed of the first lens and the second lens is arranged to collect the excitation light reflected by the excitation light combining section to a predetermined light collection position, in essence. Further, the number of lenses constituting the light collection optical system can be one, or three or more.

The fluorescence generation section 70 is disposed in the vicinity of the light collection position, and has a fluorescent layer 72 for generating a fluorescence including the red light and the green light from some of the blue light collected by the light collection optical system 60, and a transparent member 74 for supporting the fluorescent layer 72. The fluorescence generation section 70 is disposed at a position where the blue light collected by the light collection optical system 60 enters the fluorescent layer 72 in a defocused state. The fluorescence generation section 70 emits the light including the blue light, which is transmitted through the fluorescent layer 72 without being involved in the generation of the fluorescence, together with the fluorescence, and appearing white light as a whole.

The fluorescent layer 72 is formed of a layer including $(Y,Gd)_3(Al,Ga)_5O_{12}$:Ce as a YAG fluorescent material. It should be noted that the fluorescent layer can be formed of a layer including a YAG fluorescent material other than $(Y,Gd)_3(Al,Ga)_5O_{12}$:Ce, a layer including a silicate fluorescent material, or a layer including a TAG fluorescent material. Further, a layer including a mixture of a fluorescent material (e.g., a $CaAlSiN_3$ red fluorescent material) for converting the principal excitation light into the red light and a fluorescent material (e.g., a β-SiALON green fluorescent material) for converting the principal excitation light into the green light can also be adopted.

The fluorescent layer 72 converts some of the blue light from the light collection optical system 60 into the fluorescence including the red light (having the emission intensity peak at around 610 nm) and the green light (having the emission intensity peak at around 550 nm), and then emits the fluorescence (see FIG. 4B).

It should be noted that the blue light transmitted through the fluorescent layer 72 without being involved in the generation of the fluorescence out of the blue light is emitted together with the fluorescence. On this occasion, the blue light is scattered or reflected in the fluorescent layer 72, and is therefore emitted from the fluorescent layer 72 as the light having distribution (so-called Lambertian distribution) characteristics roughly the same as those of the fluorescence.

The transparent member 74 is made of, for example, quartz glass or optical glass.

On the light collection optical system side of the fluorescent layer 72, there can be formed a layer (a so-called dichroic coat) for transmitting the excitation light and reflecting the fluorescence.

As shown in FIG. 2C, in a fluorescence generation area as the light collection area in the fluorescent layer 72, it is arranged that the blue light from the first excitation light generation section 20 and the blue light from the second excitation light generation section enter respective regions different from each other. More specifically, in the fluorescence generation area in the fluorescent layer 72, first entrance areas where the blue light emitted from the plurality of first solid-state light sources 25 enters and second entrance areas where the blue light emitted from the plurality of second solid-state light sources 35 enters are arranged alternately. In the first embodiment, the fluorescence generation area is a square 1 mm on a side.

The collimating optical system 80 roughly collimates the light from the fluorescence generation section 70. As shown in FIGS. 1 and 2A, the collimating optical system 80 is provided with a first lens 82 and a second lens 84. The first lens 82 and the second lens 84 are each formed of a biconvex lens. It should be noted that the shapes of the first lens and the second lens are not limited to the shape described above, but can be the shapes with which the collimating optical system is composed of the first lens and the second lens is arranged to roughly collimate the light from the fluorescence generation section 70, in essence. Further, the number of lenses constituting the collimating optical system can be one, or more than two.

As shown in FIG. 1, the first lens array 120 has a plurality of first small lenses 122 for dividing the light from the light source device 10 into a plurality of partial light beams. The first lens array 120 has a function as a beam splitting optical element for splitting the light from the light source device 10 into a plurality of partial light beams, and has a configuration of arranging the plurality of first small lenses 122 in a plane perpendicular to the illumination light axis 100ax in a matrix with a plurality of rows and a plurality of columns. Although the explanation with reference to a drawing will be omitted, an outer shape of the first small lens 122 is substantially similar to an outer shape of the image forming areas of the liquid crystal light modulation devices 400R, 400G, and 400B.

The second lens array 130 has a plurality of second small lenses 132 corresponding to the first small lenses 122 of the first lens array 120. The second lens array 130 has a function of imaging the image of each of the first small lenses 122 of the first lens array 120 in the vicinity of the image forming areas of the liquid crystal light modulation devices 400R, 400G, and 400B in cooperation with the overlapping lens 150. The second lens array 130 has a configuration of arranging the plurality of second small lenses 132 in a plane perpendicular to the illumination light axis 100ax in a matrix with a plurality of rows and a plurality of columns.

The polarization conversion element 140 is a polarization conversion element for converting each of the partial beams split by the first lens array 120 into a substantially unique linearly polarized light beam having a uniform polarization direction, and emitting the resulted partial light beams.

The polarization conversion element 140 has a polarization split layer for transmitting one linearly polarized component out of the polarization components included in the light from the light source 10 without modification while reflecting the other linearly polarized component in a direction perpendicular to the illumination light axis 100ax, a reflecting layer for reflecting the other linearly polarized component, which is reflected by the polarization split layer, in a direction parallel to the illumination light axis 100ax, and a wave plate for converting the other linearly polarized component reflected by the reflecting layer into the one linearly polarized component.

The overlapping lens 150 makes the partial light beams from the polarization conversion element 140 overlap in the illuminated area. The overlapping lens 150 is an optical element for collecting each of the partial light beams and then overlapping the partial light beams in the vicinity of the image forming area of each of the liquid crystal light modulation devices 400R, 400G. The overlapping lens 150 is disposed so that the optical axis of the overlapping lens 150 and the optical axis of the illumination device 100 become substantially identical to each other. It should be noted that the overlapping lens 150 can also be configured with a compound lens having a plurality of lenses combined with each other. The first lens array 120, the second lens array 130, and the overlapping lens 150 constitute an integrator optical system for further homogenizing the light from the light source device 10 as a lens integrator optical system.

It should be noted that a rod integrator optical system provided with an integrator rod can also be used instead of the lens integrator optical system.

The color separation light guide optical system 200 is provided with dichroic mirrors 210, 220, reflecting mirrors 230, 240, and 250, and relay lens 260, 270. The color separation light guide optical system 200 has a function of separating the light from the illumination device 100 into the red light, the green light, and the blue light, and respectively guiding the colored lights of the red light, the green light, and the blue light to the liquid crystal light modulation devices 400R, 400G, and 400B to be the objects of illumination.

Collecting lenses 300R, 300G, and 300B are disposed between the color separation light guide optical system 200 and the liquid crystal light modulation devices 400R, 400G, and 400B, respectively.

The dichroic mirrors 210, 220 are mirrors each having a wavelength selecting transmissive film formed on a substrate, which reflects the light in a predetermined wavelength band and transmits the light in another wavelength band.

The dichroic mirror 210 is a dichroic mirror for reflecting the red light component and transmitting the green light and blue light components.

The dichroic mirror 220 is a dichroic mirror for reflecting the green light component and transmitting the blue light component.

The reflecting mirror 230 is a reflecting mirror for reflecting the red light component.

The reflecting mirrors 240, 250 are reflecting mirrors for reflecting the blue light component.

The red light reflected by the dichroic mirror 210 is reflected by the reflecting mirror 230, and enters the image forming area of the liquid crystal light modulation device 400R for the red light after being transmitted through the collecting lens 300R.

The green light having been transmitted through the dichroic mirror 210 is reflected by the dichroic mirror 220, and then enters the image forming area of the liquid crystal light modulation device 400G for the green light after being transmitted through the collecting lens 300G.

The blue light having been transmitted through the dichroic mirror 220 enters the image forming area of the liquid crystal light modulation device 400B for the blue light via the relay lens 260, the reflecting mirror 240 on the entrance side, the relay lens 270, the reflecting mirror 250 on the exit side, and the collecting lens 300B. The relay lenses 260, 270 and the reflecting mirrors 240, 250 have a function of guiding the blue light component thus transmitted through the dichroic mirror 220 to the liquid crystal light modulation device 400B.

It should be noted that since the length of the light path of the blue light is larger than the lengths of the light paths of the other colored lights, such relay lenses 260, 270 are provided to the light path of the blue light in order for preventing degradation of the light efficiency caused by the diffusion of the light. In the projector 1000 according to the first embodiment, such a configuration as described above is adopted because the length of the light path of the blue light beam is large. However, it is also possible to adopt the configuration in which the length of the light path of the red light is elongated, and the relay lenses 260, 270 and the reflecting mirrors 240, 250 are used in the light path of the red light.

The liquid crystal light modulation devices 400R, 400G, and 400B are for modulating the respective colored lights having entered in accordance with the image information to thereby form a color image, and become the illumination object of the illumination device 100. It should be noted that, although omitted from the drawings, the entrance side polarization plates are disposed between the collecting lenses 300R, 300G, and 300B and the liquid crystal light modulation devices 400R, 400G, and 400B, respectively, so as to intervene therebetween, and the exit side polarization plates are disposed between the liquid crystal light modulation devices 400R, 400G, and 400B and the cross dichroic prism 500, respectively, so as to intervene therebetween. The light modulation of the respective colored lights having entered is performed by the entrance side polarization plates, the liquid crystal light modulation devices 400R, 400G, and 400B, and the exit side polarization plates described above.

The liquid crystal light modulation devices 400R, 400G, and 400B are each a transmissive liquid crystal light modulation device formed by encapsulating a liquid crystal material as an electro-optic material between a pair of transparent glass plates, and modulates the polarization direction of a single kind of linearly polarized light emitted from the entrance side polarization plate in accordance with image signal provided thereto using, for example, polysilicon TFTs as switching elements.

The cross dichroic prism 500 is an optical element for combining the optical images modulated for respective colored lights emitted from the respective exit side polarization plates to thereby form a color image. The cross dichroic prism 500 has a substantially rectangular planar shape composed of four rectangular prisms bonded to each other, and on the substantially X-shaped interfaces on which the rectangular prisms are bonded to each other, there are formed dielectric multilayer films. The dielectric multilayer film formed on one of the substantially X-shaped interfaces is for reflecting the red light, and the dielectric multilayer film formed on the other of the interfaces is for reflecting the blue light. The red light and the blue light are deflected by these dielectric multilayer films to have the proceeding direction aligned with the proceeding direction of the green light, thus the three colored lights are combined to each other.

The color image emitted from the cross dichroic prism 500 is projected in an enlarged manner by the projection optical system 600 to form an image on the screen SCR.

Then, advantages of the light source device 10 and the projector 1000 according to the first embodiment will be explained.

According to the light source device 10 related to the first embodiment, the fluorescence (the red light and the green light) is generated using the excitation light (the blue light) from the two excitation light generation sections (the first excitation light generation section 20 and the second excitation light generation section 30) each provided with a plurality of solid-state light sources. Therefore, it becomes possible to further increase the luminance of the light source.

Further, according to the light source device 10 related to the first embodiment, the excitation light from each of the two excitation light generation sections enters the inside of the fluorescence generation area as the light collection area in the fluorescent layer 72. Therefore, the area of the fluorescence generation area in which the fluorescence is generated becomes sufficiently small, and there is no chance that the light efficiency is degraded due to the use of the two excitation light generation sections.

Further, according to the light source device 10 related to the first embodiment, it is arranged that the excitation lights from the two excitation light generation sections are combined using the excitation light combining section 50, and then collected by the light collection optical system 60. Therefore, it becomes possible to input the excitation light to the fluorescent layer 72 with a smaller incident angle compared to the case of combining the excitation lights from the two excitation light generation sections without using the excitation light combining section according to the first embodiment. In that sense, there is no chance that the light efficiency is degraded due to the use of the two excitation light generation sections.

In view of the advantages described above, the light source device 10 according to the first embodiment becomes the light source device capable of further increasing the luminance of the light source device without degrading the light efficiency.

Further, according to the light source device 10 related to the first embodiment, the excitation lights from the two excitation light generation sections enter the respective regions different from each other although located inside the fluorescence generation area having a sufficiently small size as described above. Therefore, there is no chance that an excessively large thermal load is applied to a certain area inside the fluorescence generation area described above, and there is no chance that the life of the fluorescent layer is shortened due to the use of the two excitation light generation sections.

Further, according to the light source device 10 related to the first embodiment, it is arranged that the excitation light from the first excitation light generation section 20 and the excitation light from the second excitation light generation section 30 enter the respective regions different from each other also in the excitation light combining section 50. Therefore, since the excitation lights from the two excitation light generation sections enter the respective regions different from each other in the excitation light combining section 50, there is no chance that the excessively large thermal load is applied to a certain area of the excitation light combining section 50, and there is no chance that the life of the excitation light combining section is shortened due to the use of the two excitation light generation sections.

Further, according to the light source device 10 related to the first embodiment, it is arranged that the excitation light combining section 50 is formed of the polarization beam combiner for transmitting the light consisting of p-polarized light and reflecting the light consisting of s-polarized light, and the excitation light from the first excitation light generation section 20 enters the excitation light combining section 50 as the excitation light consisting of p-polarized light, and the excitation light from the second excitation light generation section 30 enters the excitation light combining section 50 as the excitation light consisting of s-polarized light. Therefore, it becomes possible to combine the excitation light from the first excitation light generation section 20 and the excitation light from the second excitation light generation section 30 with high efficiency using the principle of the polarization beam combiner.

Further, according to the light source device 10 related to the first embodiment, the fluorescence generation section 70 is disposed at a position where the excitation light collected by the light collection optical system 60 enters the fluorescent layer 72 in a defocused state. Therefore, the fluorescence with high intensity can be obtained without applying an excessively large thermal load to the fluorescent layer, and it becomes possible to realize the light source device capable of preventing the deterioration and burnout of the fluorescent layer to thereby further increase the life thereof.

Further, according to the light source device 10 related to the first embodiment, it is arranged that the plurality of first solid-state light sources 25 and the plurality of second solid-state light sources 35 are each arranged in a matrix, and the first entrance areas where the excitation light emitted from the plurality of first solid-state light sources 25 enters and the second entrance areas where the excitation light emitted from the plurality of second solid-state light sources 35 enters are arranged alternately in the fluorescent layer 72. Therefore, it becomes possible to input the excitation lights from the two excitation light generation sections evenly across the inside of the fluorescence generation area.

Further, according to the light source device 10 related to the first embodiment, since the first solid-state light source 25 and the second solid-state light source 35 are each formed of a semiconductor laser, a small-sized and high-power light source device is obtained.

Further, according to the light source device 10 related to the first embodiment, since the excitation light combining section 50 formed of the polarization beam combiner is used, and the semiconductor laser emits the excitation light consisting of polarized light, there is no need for converting the excitation light into the excitation light consisting of polarized light. Therefore, the advantage that the structure of the light source device can be made simple can also be obtained.

According to the projector 1000 related to the first embodiment, since the light source device 10 according to the invention capable of further increasing the luminance without degrading the light efficiency is provided, the projector capable of further increasing the luminance of the display screen without degrading the light efficiency is obtained.

Second Embodiment

Figure 5A:
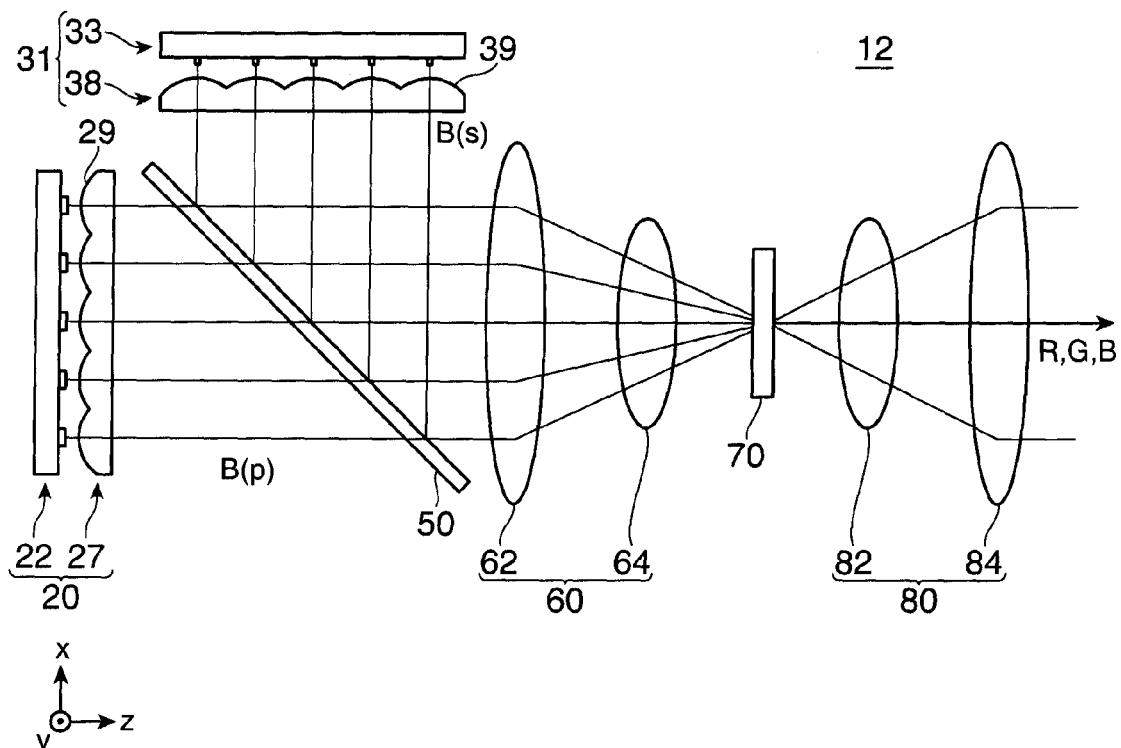
FIGS. 5A through 5C are diagrams showing a light source device 12 according to a second embodiment for the purpose of the explanation thereof.
Figure 5B:
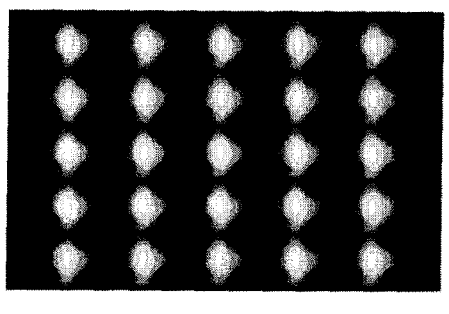
Figure 5C:
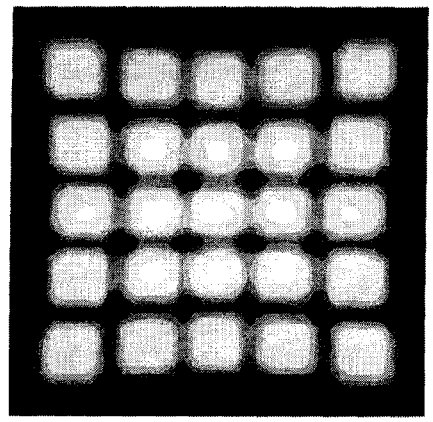

FIGS. 5A through 5C are diagrams showing a light source device 12 according to a second embodiment for the purpose of the explanation thereof. FIG. 5A is a plan view showing an optical system of the light source device 12, FIG. 5B is a diagram showing the intensity distribution of the excitation light (the blue light) in the excitation light combining section 50, and FIG. 5C is a diagram showing the intensity distribution of the excitation light (the blue light) input inside the fluorescence generation area in the fluorescent layer 72.

Figure 6A:
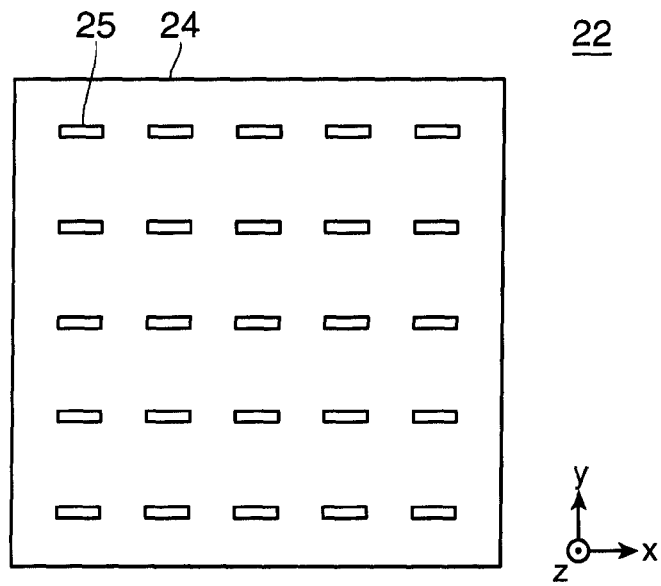
FIGS. 6A and 6B are diagrams showing a first solid-state light source array 22 and a second solid-state light source array 33 in the second embodiment for the purpose of the explanation thereof.
Figure 6B:
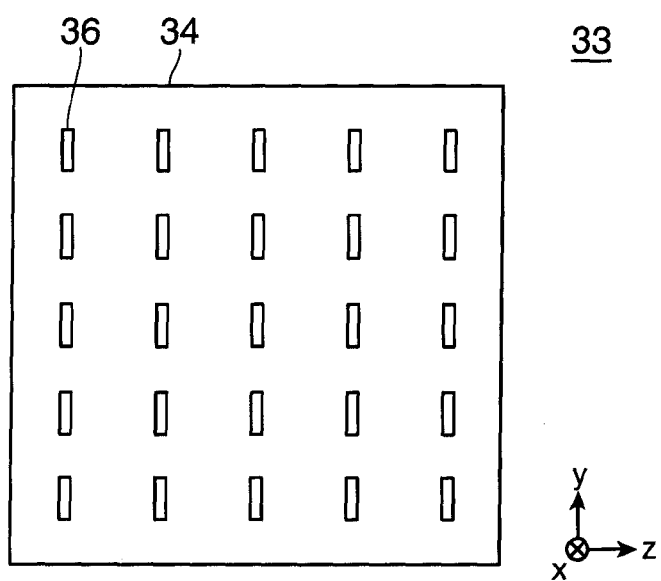

FIGS. 6A and 6B are diagrams showing the first solid-state light source array 22 and a second solid-state light source array 33 in the second embodiment for the purpose of the explanation thereof. FIG. 6A is a diagram of the first solid-state light source array 22 viewed from the side of the excitation light combining section 50, and FIG. 6B is a diagram of the second solid-state light source array 33 viewed from the side of the excitation light combining section 50.

The light source device 12 according to the second embodiment basically has a configuration substantially the same as that of the light source device 10 according to the first embodiment, but is different from the case of the light source device 10 according to the first embodiment in the configuration of the second excitation light generation section. Specifically, in the light source device 12 according to the second embodiment, as shown in FIGS. 5A through 5C, 6A, and 6B, each of the emission areas of the first solid-state light sources 25 and each of the emission areas of second solid-state light sources 36 have the relationship in which the orientations of the long side and the short side are reverse to each other. On the other hand, the first excitation light generation section 20 and a second excitation light generation section 31 are not arranged so that the blue light from the first excitation light generation section 20 and the blue light from the second excitation light generation section 30 are shifted from each other in a plane perpendicular to the light axis of the blue light combined by the excitation light combining section 50. In accordance therewith, the second excitation light generation section 31 is provided with a collimator lens array 38 corresponding to the solid-state light source array 33. Further, since it results that the second solid-state light sources 36 generates the blue light consisting of s-polarized light, the light source device 12 is not provided with the λ/2 plate 40.

As described above, the light source device 12 according to the second embodiment is different from the light source device 10 according to the first embodiment in the configuration of the second excitation light generation section. However, similarly to the light source device 10 according to the first embodiment, in the light source device 12 according to the second embodiment, the excitation lights (the blue lights) from the two excitation light generation sections (the first excitation light generation section 20 and the second excitation light generation section 31) each having a plurality of solid-state light sources are combined with each other using the excitation light combining section 50, the excitation light thus combined is collected by the light collection optical system 60, the excitation light thus collected enters the inside of the fluorescence generation area as the light collection area in the fluorescent layer 72, and the fluorescent layer 72 generates the fluorescence (the red light and the green light). Therefore, the light source device capable of further increasing the luminance of the light source device without degrading the light efficiency is obtained.

Further, according to the light source device 12 related to the second embodiment, the semiconductor laser has a rectangular emission area, and is configured so that the spread angle along the short side direction of the emission area becomes larger than the spread angle along the long side direction of the emission area. Further, at the same time, each of the emission areas of the first solid-state light sources 25 and each of the emission areas of the second solid-state light sources 36 have the relationship in which the orientations of the long side and the short side are reverse to each other. Therefore, the excitation lights from the two excitation light generation sections enter the respective regions different from each other although located inside the fluorescence generation area having a sufficiently small size as described above. Therefore, there is no chance that an excessively large thermal load is applied to a certain area inside the fluorescence generation area described above, and there is no chance that the life of the fluorescent layer is shortened due to the use of the two excitation light generation sections.

It should be noted that the light source device 12 according to the second embodiment has substantially the same configuration as that of the light source device 10 according to the first embodiment except the fact that it is different from the light source device 10 according to the first embodiment in the configuration of the second excitation light generation section, and therefore, obtains the corresponding advantages out of the advantages the light source device 10 according to the first embodiment has without change.

Third Embodiment

Figure 7A:
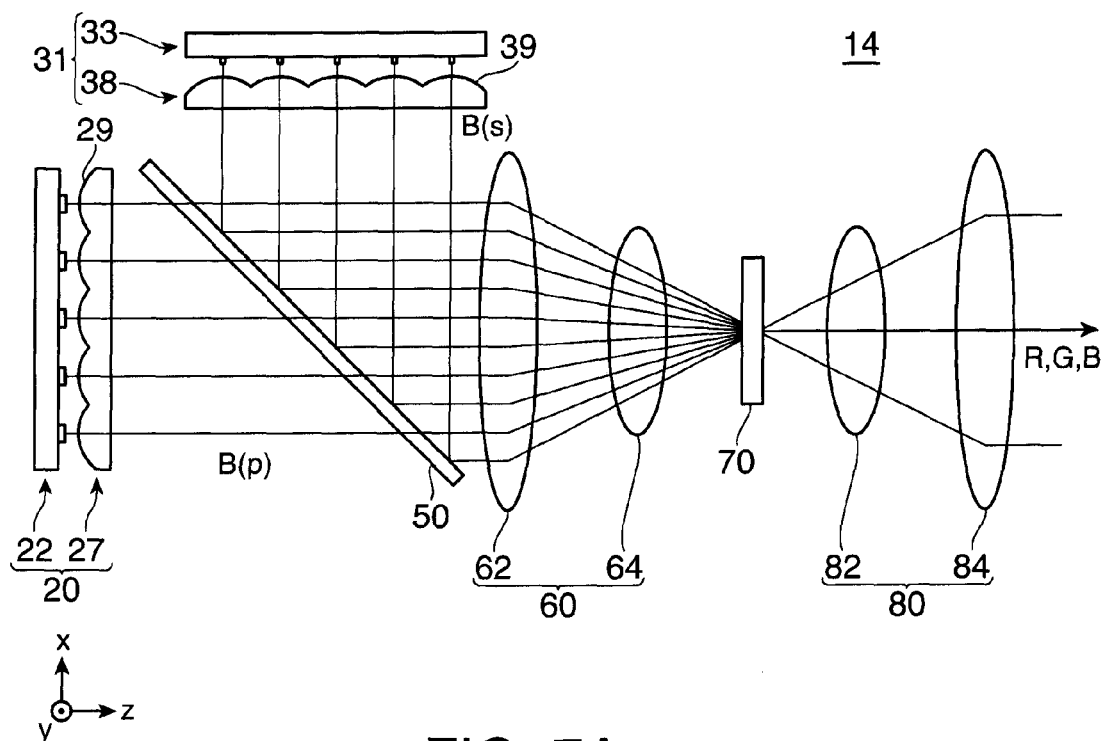
FIGS. 7A through 7C are diagrams showing a light source device 14 according to a third embodiment for the purpose of the explanation thereof.
Figure 7B:
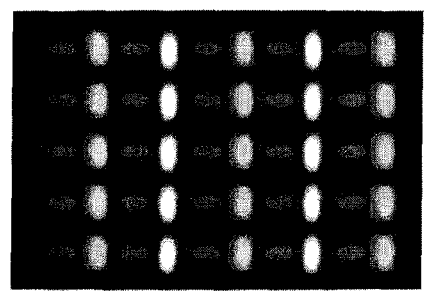
Figure 7C:
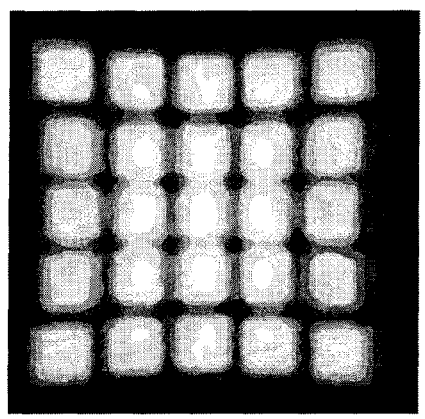

FIGS. 7A through 7C are diagrams showing a light source device 14 according to a third embodiment for the purpose of the explanation thereof. FIG. 7A is a plan view showing an optical system of the light source device 14, FIG. 7B is a diagram showing the intensity distribution of the excitation light (the blue light) in an excitation light combining section 50, and FIG. 7C is a diagram showing the intensity distribution of the excitation light (the excitation light) input inside the fluorescence generation area in the fluorescent layer 72.

The light source device 14 according to the third embodiment basically has a configuration substantially the same as that of the light source device 10 according to the first embodiment, but is different from the case of the light source device 10 according to the first embodiment in the configuration of the second excitation light generation section. Specifically, in the light source device 14 according to the third embodiment, as shown in FIGS. 7A through 7C, each of the emission areas of the first solid-state light sources 25 and each of the emission areas of the second solid-state light sources 36 have the relationship in which the orientations of the long side and the short side are reverse to each other. In accordance therewith, the second excitation light generation section 31 is provided with a collimator lens array 38 corresponding to the solid-state light source array 33. Further, since it results that the second solid-state light sources 36 generates the blue light consisting of s-polarized light, the light source device is not provided with the λ/2 plate 40. In other words, it can also be said that the light source device according to the third embodiment is a light source device having a configuration basically the same as that of the light source device 12 according to the second embodiment, and having the layout positions of the first excitation light generation section 20 and the second excitation light generation section 31 are the positions shifted from each other in a plane perpendicular to the light axis of the blue light.

As described above, the light source device 14 according to the third embodiment is different from the light source device 10 according to the first embodiment in the configuration of the second excitation light generation section. However, similarly to the light source device 10 according to the first embodiment, the excitation lights (the blue lights) from the two excitation light generation sections (the first excitation light generation section 20 and the second excitation light generation section 31) each having a plurality of solid-state light sources are combined with each other using the excitation light combining section 50, the excitation light thus combined is collected by the light collection optical system 60, the excitation light thus collected enters the inside of the fluorescence generation area as the light collection area in the fluorescent layer 72, and the fluorescent layer 72 generates the fluorescence (the red light and the green light). Therefore, the light source device capable of further increasing the luminance of the light source device without degrading the light efficiency is obtained.

Further, according to the light source device 14 related to the third embodiment, the semiconductor laser has a rectangular emission area, and is configured so that the spread angle along the short side direction of the emission area becomes larger than the spread angle along the long side direction of the emission area. Further, at the same time, each of the emission areas of the first solid-state light sources 25 and each of the emission areas of the second solid-state light sources 36 have the relationship in which the orientations of the long side and the short side are reverse to each other. Therefore, the excitation lights from the two excitation light generation sections enter the respective regions different from each other although located inside the fluorescence generation area having a sufficiently small size as described above. Therefore, there is no chance that an excessively large thermal load is applied to a certain area inside the fluorescence generation area described above, and there is no chance that the life of the fluorescent layer is shortened due to the use of the two excitation light generation sections.

It should be noted that the light source device 14 according to the third embodiment has substantially the same configuration as that of the light source device 10 according to the first embodiment except the fact that it is different from the light source device 10 according to the first embodiment in the configuration of the second excitation light generation section, and therefore, obtains the advantages the light source device 10 according to the first embodiment has without change.

Fourth Embodiment

Figure 8:
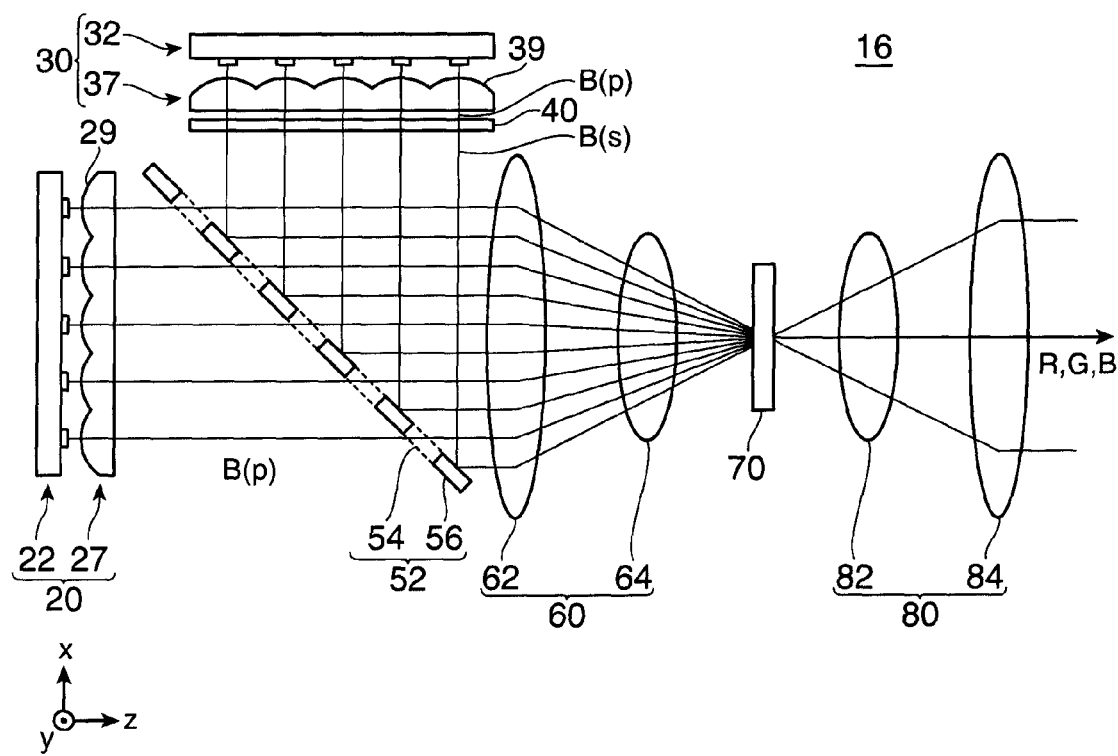
FIG. 8 is a plan view showing an optical system of a light source device 16 according to a fourth embodiment.

FIG. 8 is a plan view showing an optical system of a light source device 16 according to a fourth embodiment.

Figure 9A:
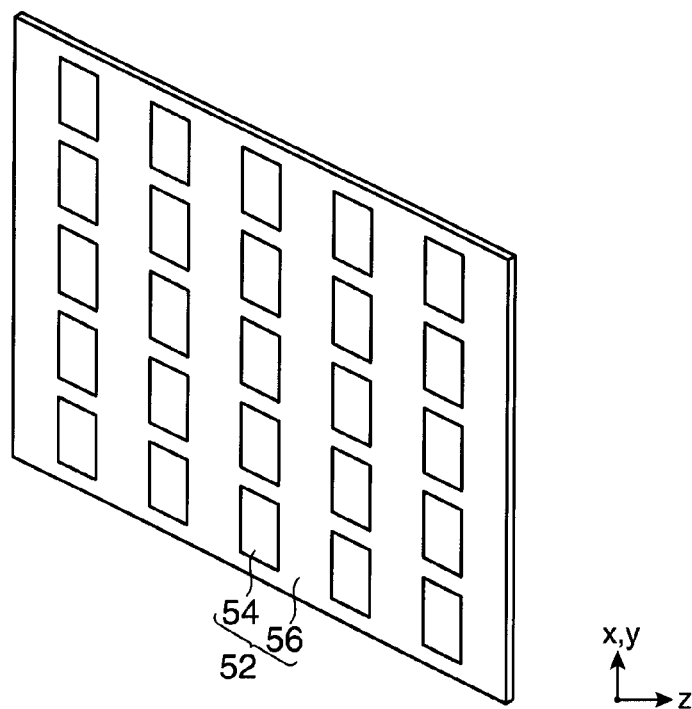
FIGS. 9A and 9B are diagrams showing an excitation light combining section 52 in the fourth embodiment for the purpose of the explanation thereof.
Figure 9B:
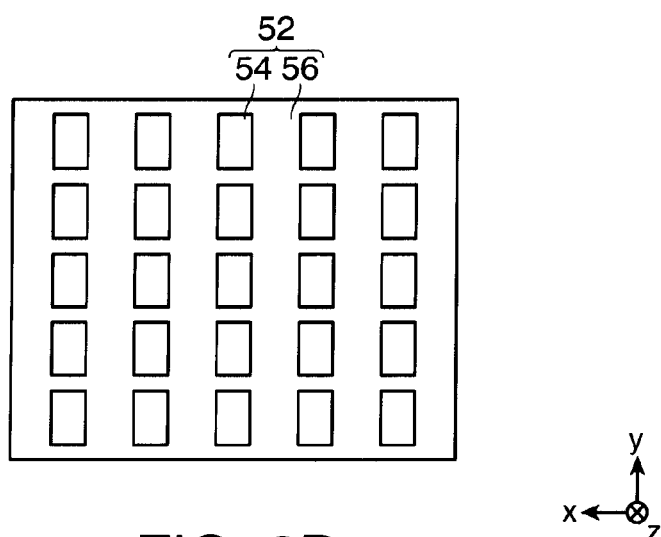

FIGS. 9A and 9B are diagrams showing an excitation light combining section 52 in the fourth embodiment for the purpose of the explanation thereof. FIG. 9A is a perspective view of the excitation light combining section 52, and FIG. 9B is a diagram of the excitation light combining section 52 viewed from the side of the first excitation light generation section 20.

The light source device 16 according to the fourth embodiment basically has a configuration substantially the same as that of the light source device 10 according to the first embodiment, but is different from the case of the light source device 10 according to the first embodiment in the configuration of the excitation light combining section. Specifically, as shown in FIGS. 8, 9A, and 9B, in the light source device 16 according to the fourth embodiment, the excitation light combining section 52 has transmission areas 54 (the reference numeral is provided only to one located at the lower center in the drawing) for transmitting the blue light from the first excitation light generation section 20, and reflecting areas 56 for reflecting the blue light from the second excitation light generation section 30. The excitation light combining section 52 is formed of a reflecting mirror provided with openings at areas corresponding to the transmission areas 54.

As described above, the light source device 16 according to the fourth embodiment is different from the light source device 10 according to the first embodiment in the configuration of the excitation light combining section. However, similarly to the light source device according to the first embodiment, the excitation lights (the blue lights) from the two excitation light generation sections (the first excitation light generation section 20 and the second excitation light generation section 31) each having a plurality of solid-state light sources are combined with each other using the excitation light combining section 50, the excitation light thus combined is collected by the light collection optical system 60, the excitation light thus collected enters the inside of the fluorescence generation area as the light collection area in the fluorescent layer 72, and the fluorescent layer 72 generates the fluorescence (the red light and the green light). Therefore, the light source device capable of further increasing the luminance of the light source device without degrading the light efficiency is obtained.

Further, according to the light source device 16 related to the fourth embodiment, the excitation light combining section 52 has the transmission areas 54 for transmitting the excitation light from the first excitation light generation section 20 and the reflecting areas 56 for reflecting the excitation light from the second excitation light generation section 30. By inputting the excitation light from the first excitation light generation section 20 into the transmission areas 54 while inputting the excitation light from the second excitation light generation section 30 into the reflecting areas 56, it becomes possible to combine the excitation light from the first excitation light generation section 20 and the excitation light from the second excitation light generation section 30 with each other with high efficiency.

Further, according to the light source device 16 related to the fourth embodiment, there are used the excitation light combining section 52 having the transmission areas 54 for transmitting the excitation light from the first excitation light generation section and the reflecting areas 56 for reflecting the excitation light from the second excitation light generation section 30, and the solid-state light sources each formed of a semiconductor laser. Therefore, it is possible to efficiently input the excitation light from the first excitation light generation section 20 into the transmission areas 54, and it is possible to efficiently input the excitation light from the second excitation light generation section 30 into the reflecting areas 56.

It should be noted that the light source device 16 according to the fourth embodiment has substantially the same configuration as that of the light source device 10 according to the first embodiment except the fact that it is different from the light source device 10 according to the first embodiment in the configuration of the excitation light combining section, and therefore, obtains the corresponding advantages out of the advantages the light source device 10 according to the first embodiment has without change.

Although the invention is explained hereinabove based on the embodiments described above, the invention is not limited to the embodiments described above. The invention can be put into practice in various forms within the scope and spirit of the invention, and the following modifications are also possible, for example.

Figure 10:
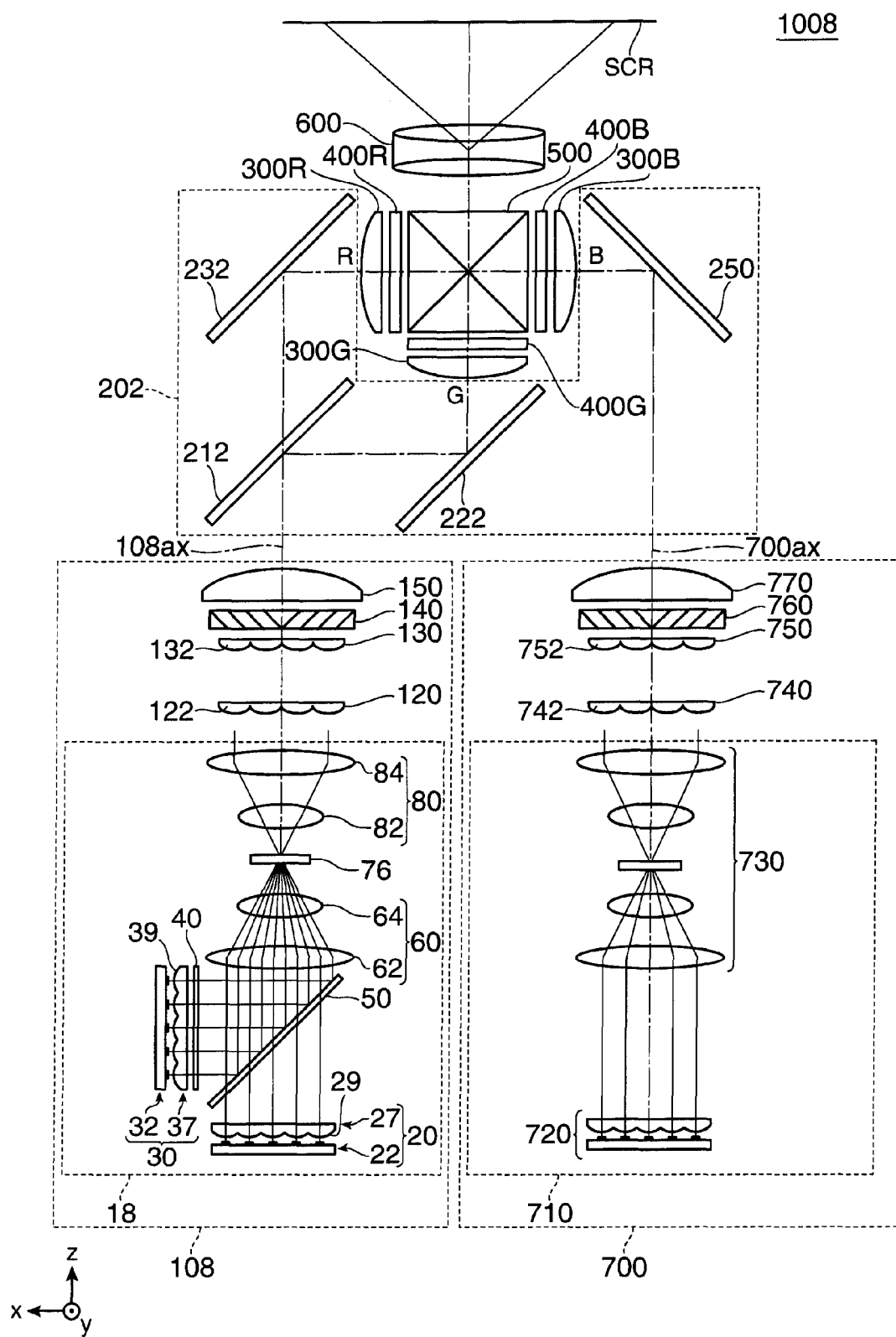
FIG. 10 is a plan view showing an optical system of a projector 1008 according to a modified example.

Although in the first embodiment described above the fluorescent layer 72 for generating the fluorescence including the red light and the green light from a part of the blue light is used, the invention is not limited thereto. FIG. 10 is a plan view showing an optical system of a projector 1008 according to a modified example. A light source device 18 in the modified example is provided with a fluorescence generation section 76 having a fluorescent layer 78 for generating the fluorescence (the red light and the green light) from the whole blue light as the fluorescent layer. Further, the projector 1008 is further provided with a second illumination device 700 for emitting the blue light. The reference numeral 720 denotes a blue light generation section having substantially the same configuration as that of the first excitation light generation section 20. The reference numeral 730 denotes a scattering optical system for collecting, scattering, and then roughly collimating the blue light. The blue light generation section 720 and the scattering optical system 730 constitute a second light source device 710. A first lens array denoted with the reference numeral 740 has substantially the same configuration as that of the first lens array 120, a second lens array denoted with the reference numeral 750 has substantially the same configuration as that of the second lens array 130, a polarization conversion element denoted with the reference numeral 760 has substantially the same configuration as that of the polarization conversion element 140, and an overlapping lens denoted with the reference numeral 770 has substantially the same configuration as that of the overlapping lens 150. Further, the projector 1008 is provided with a color separation light guide optical system 202 corresponding to an illumination device 108 and the second illumination device 700. In the case, for example, in which the projector is provided with a separate illumination device (e.g., the second illumination device 700) for emitting the blue light as shown in FIG. 10, it is also possible to use the fluorescent layer for generating the fluorescence including the red light and the green light from the whole of the blue light.

Although in each of the embodiments described above the solid-state light sources each generating the blue light as the excitation light, and the fluorescent layer for generating the fluorescence including the red light and the green light from a part of the blue light is used, the invention is not limited thereto. For example, it is also possible to use solid-state light sources each generating violet light or ultraviolet light as the excitation light, and a fluorescent layer for generating the colored light including the red light, the green light, and the blue light from the violet light or the ultraviolet light. Further, although in each of the embodiments described above the light source device is configured to emit the white light as a whole, the invention is not limited thereto. The light source device can also be configured to emit light other than the white light.

Although in the first and third embodiments there is used the configuration of shifting the layout positions of the first excitation light generation section 20 and the second excitation light generation section from each other in a plane perpendicular to the light axis of the excitation light as the configuration of inputting the excitation lights from the two excitation light generation sections inside the fluorescence generation area, the invention is not limited thereto. It is also possible to use a configuration of, for example, shifting the angle between the optical axis of the light collection optical system and the excitation light combining surface slightly from an angle of 45 degrees.

Although in the fourth embodiment described above the excitation light reflecting section 52 consisting of the reflecting mirror provided with the openings in the areas corresponding to the transmission areas 54, the invention is not limited thereto. It is also possible to use, for example, a transparent substrate provided with reflecting layer formed in the areas corresponding to the reflecting areas.

Although in each of the embodiments described above the solid-state light sources each formed of the semiconductor laser are used, the invention is not limited thereto. It is also possible to use, for example, the solid-state light sources each formed of a light emitting diode.

Although in each of the embodiments described above there are used the solid-state light sources each formed of the semiconductor laser for generating the blue light having the emission intensity peak of about 460 nm, the invention is not limited thereto. It is also possible to use the solid-state light sources each formed of a semiconductor laser for generating the blue light having the emission intensity peak in a range of 440 nm through 450 nm. By adopting such a configuration as described above, it becomes possible to improve the efficiency in generating the fluorescence from the blue light in the fluorescent body.

Although in each of the embodiments the p-polarized light is used as the one polarized light while the s-polarized light is used as the other polarized light, the invention is not limited thereto. It is also possible to use the s-polarized light as the one polarized light while using the p-polarized light as the other polarized light.

Although in each of the embodiments described above a square fluorescence generation area 1 mm on a side is used as the fluorescence generation area, the invention is not limited thereto. Since the fluorescence generation area having a size included in the square 1 mm on a side is sufficient, it is also possible to use a fluorescence generation area of a smaller size (e.g., a square 0.8 mm on a side or a square 0.6 mm on a side) as the fluorescence generation area. By adopting such a configuration, the area of the fluorescence generation area where the fluorescence is generated can be made further small enough.

Although in the first embodiment described above the transmissive projector is used, the invention is not limited thereto. It is also possible to use, for example, a reflective projector. It should be noted here that "transmissive" denotes that the light modulation device as the light modulation section is a type of transmitting a light beam such as a transmissive liquid crystal display device, and "reflective" denotes that the light modulation device as the light modulation section is a type of reflecting a light beam such as a reflective liquid crystal display device. Also in the case in which the invention is applied to the reflective projector, the same advantages as in the case with the transmissive projector can be obtained.

Although in the first embodiment described above the liquid crystal light modulation devices are used as the light modulation devices of the projector, the invention is not limited thereto. Any devices for modulating the incident light in accordance with the image information, in general, can be adopted as the light modulation devices, and micromirror light modulation devices and so on can also be used. As the micromirror light modulation device, for example, a digital micromirror device (DMD, a trademark of Texas Instruments) can be used.

Although in the first embodiment described above the explanation is presented showing, as an example, the projector using three liquid crystal light modulation devices, the invention is not limited thereto. The invention can also be applied to the projector using one, two, or more than three liquid crystal light modulation devices.

The invention can be applied to a front projection projector for performing projection from the side of observing the projection image, and also to a rear projection projector for performing projection from the side opposite to the side of observing the projection image.

Although in each of the embodiments described above, the example of applying the light source device according to the invention to the projector is explained, the invention is not limited thereto. For example, the light source device according to the invention can also be applied to other optical equipment (e.g., an optical disk device, a headlight of a vehicle, and an illumination device).

What is claimed is:
1. A light source device comprising:
a first excitation light generation section having a first solid-state light source array having first solid-state light sources adapted to generate a first excitation light, and a first collimating lens array having first collimating lenses disposed so as to correspond to the first solid-state light sources, and adapted to roughly collimate the excitation light generated by the first solid-state light sources;
a second excitation light generation section having a second solid-state light source array having second solid-state light sources adapted to generate a second excitation light, and a second collimating lens array having second collimating lenses disposed so as to correspond to the second solid-state light sources, and adapted to roughly collimate the excitation light generated by the second solid-state light sources;
an excitation light combining section adapted to combine the first excitation light and the second excitation light;
a light collection optical system adapted to collect the first excitation light and the second excitation light combined by the excitation light combining section at a predetermined light collection position; and
a fluorescence generation section located in a vicinity of the light collection position, and having a fluorescent layer adapted to generate a fluorescence from at least a part of the first excitation light and the second excitation light collected by the light collection optical system, wherein
the excitation light combining section is adapted to transmit the first excitation light and reflect the second excitation light to thereby combine the first excitation light and the second excitation light with each other.

2. The light source device according to claim 1, wherein the first excitation light and the second excitation light are arranged to enter respective areas different from each other in a fluorescence generation area as a light collection area in the fluorescent layer.

3. The light source device according to claim 1, wherein the light source device is arranged to input the first excitation light and the second excitation light into respective areas different from each other in the excitation light combining section.

4. The light source device according to claim 2, wherein the light source device is arranged to input the first excitation light and the second excitation light into respective areas different from each other in the excitation light combining section.

5. The light source device according to claim 3, wherein the excitation light combining section has a transmission area adapted to transmit the first excitation light and a reflecting area adapted to reflect the second excitation light.

6. The light source device according to claim 4, wherein the excitation light combining section has a transmission area adapted to transmit the first excitation light and a reflecting area adapted to reflect the second excitation light.

7. The light source device according to claim 1, wherein the excitation light combining section consists of a polarization beam combiner adapted to transmit light consisting of one polarized light and reflect light consisting of the other polarized light, and
the light source device is arranged so that the first excitation light enters the excitation light combining section as the excitation light consisting of the one polarized light and the second excitation light enters the excitation light combining section as the excitation light consisting of the other polarized light.

8. The light source device according to claim 2, wherein the excitation light combining section consists of a polarization beam combiner adapted to transmit light consisting of one polarized light and reflect light consisting of the other polarized light, and
the light source device is arranged so that the first excitation light enters the excitation light combining section as the excitation light consisting of the one polarized light and the second excitation light enters the excitation light combining section as the excitation light consisting of the other polarized light.

9. The light source device according to claim 3, wherein the excitation light combining section consists of a polarization beam combiner adapted to transmit light consisting of one polarized light and reflect light consisting of the other polarized light, and
the light source device is arranged so that the first excitation light enters the excitation light combining section as the excitation light consisting of the one polarized light and the second excitation light enters the excitation light combining section as the excitation light consisting of the other polarized light.

10. The light source device according to claim 1, wherein the fluorescence generation section is disposed at a position where the first excitation light and the second excitation light collected by the light collection optical system enter the fluorescent layer in a defocused state.

11. The light source device according to claim 2, wherein the fluorescence generation section is disposed at a position where the first excitation light and the second excitation light collected by the light collection optical system enter the fluorescent layer in a defocused state.

12. The light source device according to claim 10, wherein in the first excitation light generation section and the second excitation light generation section, the first solid-state light sources and the second solid-state light sources are each arranged in a matrix, and
the light source device is configured so that first entrance areas where the first excitation light enters and second entrance areas where the second excitation light enters are arranged alternately in the fluorescent layer.

13. The light source device according to claim 11, wherein in the first excitation light generation section and the second excitation light generation section, the first solid-state light sources and the second solid-state light sources are each arranged in a matrix, and
the light source device is configured so that first entrance areas where the first excitation light enters and second entrance areas where the second excitation light enters are arranged alternately in the fluorescent layer.

14. The light source device according to claim 1, wherein the first solid-state light sources and the second solid-state light sources are formed of semiconductor lasers.

15. The light source device according to claim 2, wherein the first solid-state light sources and the second solid-state light sources are formed of semiconductor lasers.

16. The light source device according to claim 14, wherein the semiconductor laser is configured to have an emission area having a rectangular shape, and a spread angle along a short side of the emission area larger than a spread angle along a long side of the emission area, and each of the emission areas of the first solid-state light sources and each of the emission areas of the second solid-state light sources have a relationship in which orientations of the long side and the short side are reverse to each other.

17. The light source device according to claim 15, wherein the semiconductor laser is configured to have an emission area having a rectangular shape, and a spread angle along a short side of the emission area larger than a spread angle along a long side of the emission area, and each of the emission areas of the first solid-state light sources and each of the emission areas of the second solid-state light sources have a relationship in which orientations of the long side and the short side are reverse to each other.

18. A projector comprising:
an illumination device having the light source device according to claim 1;
a light modulation device adapted to modulate light from the illumination device in accordance with image information; and
a projection optical system adapted to project modulated light from the light modulation device as a projection image.

19. A projector comprising:
an illumination device having the light source device according to claim 2;
a light modulation device adapted to modulate light from the illumination device in accordance with image information; and
a projection optical system adapted to project modulated light from the light modulation device as a projection image.

* * * * *